United States Patent
Fujimura et al.

(10) Patent No.: US 7,056,975 B2
(45) Date of Patent: Jun. 6, 2006

(54) THERMOPLASTIC RESIN COMPOSITION HAVING IMPROVED RESISTANCE TO HYDROLYSIS

(75) Inventors: Hideki Fujimura, Yamaguchi (JP); Toshio Moriyama, Yamaguchi (JP); Shinya Matsuda, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 220 days.

(21) Appl. No.: 10/853,111

(22) Filed: May 26, 2004

(65) Prior Publication Data

US 2004/0242774 A1 Dec. 2, 2004

(30) Foreign Application Priority Data

May 27, 2003 (JP) .......................... 2003-149895
May 27, 2003 (JP) .......................... 2003-149896
May 27, 2003 (JP) .......................... 2003-149902

(51) Int. Cl.
*C08L 77/00* (2006.01)
*C08L 51/04* (2006.01)
*C08L 67/00* (2006.01)
*C08L 69/00* (2006.01)
*C08L 23/00* (2006.01)

(52) U.S. Cl. .................. 524/514; 524/538; 525/66; 525/184; 525/424; 525/425; 525/432

(58) Field of Classification Search ............. 525/432, 525/424, 425, 66, 184; 524/514, 538
See application file for complete search history.

(56) References Cited

U.S. PATENT DOCUMENTS 5,886,097 A * 3/1999 Fukumoto et al. ............ 525/66
5,900,471 A * 5/1999 Glans .......................... 528/170

* cited by examiner

*Primary Examiner*—Ana Woodward
(74) *Attorney, Agent, or Firm*—Nixon Peabody LLP; Jeffrey L. Costellia

(57) ABSTRACT

A thermoplastic resin composition composed of a thermoplastic resin and a polyamide elastomer in which the polyamide elastomer contains at least 50 weight % of a polyetheramide elastomer prepared by polymerization of a tri-block polyetherdiamine compound, a polyamide-forming monomer is an aminocarboxylic acid and/or a lactam compound, and a dicarboxylic acid compound, in which the tri-block polyetherdiamine compound has the formula (1):

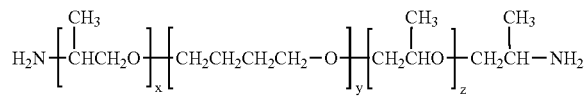

(1)

[each of x and y is an integer of 1 to 20, and y is an integer of 4 to 50].

13 Claims, No Drawings

THERMOPLASTIC RESIN COMPOSITION HAVING IMPROVED RESISTANCE TO HYDROLYSIS

FIELD OF THE INVENTION

The present invention relates to a thermoplastic resin composition having improved resistance to hydrolysis.

BACKGROUND OF THE INVENTION

It is known that an elastomer component is added to a thermoplastic resin so as to improve flexibility and impact resistance of the thermoplastic resin. However, there are such problems that the addition of an elastomer component increases a melting viscosity and further lowers resistance of the thermoplastic resin to hydrolysis.

U.S. Pat. No. 5,900,471 describes addition of polyetheramide block copolymer to a polyamide resin. In this patent, the polyetheramide has polyether segments containing an ethylene oxide block of the following formula:

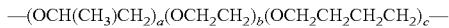
—(OCH(CH$_3$)CH$_2$)$_a$(OCH$_2$CH$_2$)$_b$(OCH$_2$CH$_2$CH$_2$CH$_2$)$_c$—

[in the formula, each of a, b and c is in the range of 0 to 1 and a+b+c=1].

There is also known addition of polyetheresteramide to a thermoplastic resin such as a polyamide resin.

SUMMARY OF THE INVENTION

According to studies of the present inventors, the known polyetheramide having polyether segments which contain an ethylene oxide block shows a high water absorption. In most cases, a thermoplastic resin composition showing a high water absorption is unfavorable.

It is further confirmed that the thermoplastic resin composition containing a polyetheresteramide elastomer shows low resistance to hydrolysis.

Accordingly, the present invention has an object to provide an elastomer-incorporated thermoplastic resin composition showing a low water absorption and a high resistance to hydrolysis.

The present invention resides in a thermoplastic resin composition comprising a mixture of a thermoplastic resin and a polyamide elastomer wherein the polyamide elastomer contains at least 50 weight % of a polyetheramide elastomer prepared by polymerization of a tri-block polyetherdiamine compound, a polyamide-forming monomer selected from the group consisting of an aminocarboxylic acid and a lactam compound, and a dicarboxylic acid compound, the tri-block polyetherdiamine compound having the following formula (1):

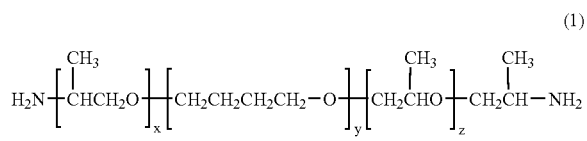

(1)

in which each of x and y independently represents an integer of 1 to 20, and y represents an integer of 4 to 50.

The invention also resides in a thermoplastic resin composition comprising a thermoplastic resin and a polyamide elastomer wherein the polyamide elastomer contains at least 50 weight % of a polyetheramide elastomer comprising 15 to 80 weight % (preferably 15 to 75 weight %, more preferably 15 to 80 weight %, more preferably 15 to 75 weight %, more preferably 18 to 70 weight %, most preferably 20 to 60 weight %) of the following polyether segment (5):

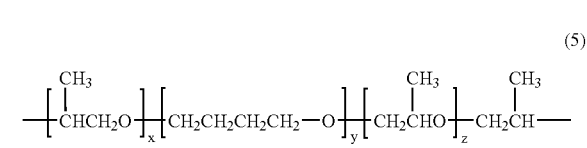

(5)

in which each of x and y independently represents an integer of 1 to 20, and y represents an integer of 4 to 50.

Preferred embodiments of the invention are described below:

(1) The mixture comprises 95 to 50 weight % of the thermoplastic resin and 5 to 50 weight % of the polyamide elastomer, preferably 90 to 60 weight % of the thermoplastic resin and 10 to 40 weight % of the polyamide elastomer, more preferably 85 to 70 weight % of the thermoplastic resin and 15 to 30 weight % of the polyamide elastomer.

(2) The thermoplastic resin is polyamide.

(3) The dicarboxylic acid has the following formula (2):

HOOC—(R$^1$)$_m$—COOH (2)

in which R$^1$ is a linking group containing a hydrocarbon chain, preferably comprising an alkylene group having 1 to 20 carbon atoms, and m is 0 or 1.

(4) The dicarboxylic acid is selected from the group consisting of an aliphatic dicarboxylic acid and an alicyclic dicarboxylic acid.

(5) The polyamide-forming monomer is an aminocarboxylic acid having the following formula (3) or a lactam compound having the following formula (4):

H$_2$N—R$^2$—COOH (3)

—R$^3$—CONH— (4)

in which each of R$^2$ and R$^3$ independently is a linking group having a hydrocarbon chain. R$^2$ preferably comprises an alkylene group having 2 to 20 carbon atoms. R$^3$ preferably comprises an alkylene group having 3 to 20 carbon atoms.

(6) The resin composition further comprises a plasticizer in an amount of 1 to 30 weight parts based on 100 weight parts of the mixture.

(7) The resin composition further comprises a flame retardant in an amount of 5 to 40 weight parts based on 100 weight parts of the mixture.

(8) A thermoplastic article comprising the thermoplastic resin composition of the invention.

DETAILED DESCRIPTION OF THE INVENTION

In the invention, the thermoplastic resin can be polyamide such as aliphatic polyamide, alicyclic polyamide, or aromatic polyamide, polyolefin such as polyethylene or polypropylene, maleic acid-denatured polyolefin, polyester, polycarbonate, polyurethane, or ABS resin. The thermoplastic resin preferably has a softening temperature of 300° C. or lower, more preferably 290° C. or lower, most preferably 280° C. or lower.

Preferably, the thermoplastic resin is a polyamide resin. More preferably, the thermoplastic resin is an aliphatic polyamide resin or an alicyclic polyamide resin. The most preferred thermoplastic resin is an aliphatic polyamide resin such as nylon 6, nylon 66, nylon 610, nylon 11, nylon 12, or nylon 612.

The polyamide elastomer employed in the invention contains at least 50 weight % (preferably 60 weight % or more, more preferably 70 weight %. or more, more preferably 80 weight % or more, most preferably 90 weight % or more) of the polyetheramide elastomer.

The polyetheramide elastomer employed in the invention can be prepared by polymerizing a polyamide-forming compound such as an aminocarboxylic acid compound and/or a lactam compound, the specific tri-block polyetherdiamine compound, and a dicarboxylic acid compound.

The aminocarboxylic acid compounds and/or lactam compounds can be aliphatic, alicyclic or aromatic. Their examples include ω-aminocarboxylic acids, lactam compounds, compounds prepared from diamine and dicarboxylic acid, and their salts. The diamine can be an aliphatic diamine, an alicyclic diamine, an aromatic diamine, or one of their derivatives. The dicarboxylic acid can be an aliphatic dicarboxylic acid, an alicyclic dicarboxylic acid, an aromatic dicarboxylic acid, or one of their derivatives. Preferred is an aminocarboxylic acid prepared from an aliphatic diamine and an aliphatic dicarboxylic acid.

Examples of the diamine compounds include aliphatic diamine compounds having 2 to 20 carbon atoms such as ethylene diamine, triethylene diamine, tetramethylene diamine, hexamethylene diamine, heptamethylene diamine, octamethylene diamine, nonamethylene diamine, decamethylene diamine, undecamethylene diamine, dodecamethylene diamine, 2,2,4-trimethylhexamethylene diamine, 2,4,4-trimethylhexamethylenediamine, and 3-methylpentamethylene diamine.

Examples of the dicarboxylic acid compounds include aliphatic dicarboxylic acid compounds having 2 to 20 carbon atoms such as oxalic acid, succinic acid, glutaric acid, adipic acid, pimelic acid, suberic acid, azelaic acid, sebacic acid, and dodeca diacid.

Examples of the lactam compounds include aliphatic lactam compounds having 5 to 20 carbon atoms such as ε-caprolactame, ω-enantolactame, ω-undecalactam, ω-dodecalactame, and 2-pyrrolidone. Examples of the ω-aminocarboxylic acids include aliphatic ω-aminocarboxylic acids having 5 to 20 carbon atoms such as 6-aminocaproic acid, 7-aminoheptanoic acid, 8-aminooctanoic acid, 10-aminocapric acid, 11-aminoundecanoic acid, and 12-aminododecanoic acid.

The tri-block polyetherdiamine compound employed in the invention can be identified an XYX-triblock polyetherdiamine compound. Preferred examples of the XYX-triblock polyetherdiamine compounds include XTJ-533 (commercially available from HUNTSMAN Corp., USA: a compound of the formula (1) in which x is approx. 12, y is approx. 11, and z is approx. 11), XTJ-536 (commercially available from HUNTSMAN Corp.: a compound of the formula (1) in which x is approx. 8.5, y is approx. 17, and z is approx. 7.5), and XTJ-542 (commercially available from HUNTSMAN Corp.: a compound of the formula (1) in which x is approx. 3, y is approx. 9, and z is approx. 2).

Also preferred are an XYX-triblock polyetherdiamine compound in which x is approx. 3, y is approx. 14, and z is approx. 2); an XYX-triblock polyetherdiamine compound having the formula (1) in which x is approx. 5, y is approx. 14, and z is approx. 4), and an XYX-triblock polyetherdiamine compound having the formula (1) in which x is approx. 3, y is approx. 19, and z is approx. 2).

Examples of the dicarboxylic acid compounds are those described hereinbefore for the aminocarboxylic acid compound and/or lactam compound. In addition, dimer acids (i.e., dimerized aliphatic dicarboxylic acids having 14 to 48 carbon atoms which can be produced by dimerization of unsaturated fatty acids obtainable by fractional distillation of triglycerides) and their hydrogenated products (i.e., hydrogenated dimer acids); alicyclic dicarboxylic acids such as 1,4-cyclohexanedicarboxylic acid and aromatic dicarboxylic acids such as terephthalic acid and isophthalic acids can be employed. Examples of the commercially available dimer acids and hydrogenated dimer acids include Pripol 1004, Pripol 1006, Pripol 1009, and Pripol 1013.

The polyetheramide elastomer of the invention can be produced by fusing a mixture of the polyamide-forming compound, the tri-block polyetherdiamine compound, and a dicarboxylic acid at an atmospheric pressure or increased pressure to cause polymerization, and if desired, further fusing the mixture under reduced pressure to continue the polymerization. Otherwise, the polyetheramide elastomer can be produced by fusing first a mixture of the polyamide-forming compound and a dicarboxylic acid at an atmospheric pressure or increased pressure to give an oligomer and subsequently fusing a mixture of the oligomer and the triblock polyetherdiamine compound to cause polymerization, and if desired, further fusing the mixture under reduced pressure to continue the polymerization.

The polymerization can be carried out preferably at a temperature of 150 to 300° C., more preferably 160 to 280° C., most preferably 180 to 250° C.

In the case that the polyamide-forming compound is an ω-aminocarboxylic acid, the polymerization can be preferably carried out at an atmospheric pressure or at a combination of an atmospheric pressure and a reduced pressure.

In the case that the polyamide-forming compound is a lactam or a compound produced by diamine and dicarboxylic acid (or its salt), the polymerization can be preferably carried out at an increased pressure (such as up to 5 MPa) in the presence of an appropriate amount of water and then at an atmospheric pressure and/or a reduced pressure.

The period of time required for the polymerization generally is 0.5 to 30 hours.

The polymerization can be carried out by a batch system or a continuous system.

In the polymerization for production of the polyetheramide elastomer of the invention, one or more of appropriate additives can be employed for adjusting the molecular weight of the resulting elastomer or giving an elastomer which shows stable viscosity when the elastomer is molded or processed at an elevated temperature. Examples of the additives include monoamines and diamines such as laurylamine, stearylamine, hexamethylene diamine, and methaxylylene diamine, and monocarboxylic acids and dicarboxylic acids such as acetic acid, benzoic acid, stearic acid, adipic acid, sebacic acid, and dodeca diacid. These additives can be employed in such an amount to give a polymer having a relative viscosity of 1.2 to 3.5 (0.5 wt./vol. %, in m-cresol, 25° C.).

In the polymerization for production of the polyetheramide elastomer of the invention, a catalyst can be employed, if desired. Examples of the catalysts include phosphoric acid, pyrophosphoric acid, polyphosphoric acid, phosphorous acid, hypophosphorous acid, and their alkali metal salts and their alkaline earth metal salts. Some of these inorganic phosphorus compounds can serve to impart heat resistance to the resulting polymer. The inorganic phosphorus compound can be employed in an amount of 50 to 3,000 ppm, based on the amount of a mixture of the starting compounds.

Other additives can be heat resistant agents, UV absorbers, anti-light stabilizers, oxidation inhibitors, antistatic agents, lubricants, anti-slipping agent, crystallizing nuclei, tackiness agents, sealing improvers, anti-foggants, releasing agents, plasticizers, pigments, dyes, perfume, flame retardant, and reinforcing materials.

The polyamide elastomer employed in the invention may contain less than 50 weight % of polyamide elastomers other than the specified polyetheramide elastomer. Examples of the other polyamide elastomers include polyetheramide elastomers other than the polyetheramide elastomers defined in the invention, and polyetheresteramide elastomers. Examples of the polyetheramide elastomers other than the polyetheramide elastomers defined in the invention include elastomers comprising polyamide segments composed of an aliphatic nylon block such as nylon 6 block, nylon 66 block, nylon 11 block, and nylon 12 block and polyether segments composed of polyoxyethylene block, polyoxypropylene block, and polyoxybutylene block.

The thermoplastic resin composition of the invention may contain a relatively small amount of a plasticizer such as an ester compound and an alkylamide.

Examples of the ester plasticizers include phthalic esters, fatty acid esters, polyhydric alcohol esters, phosphate esters, trimellitic esters, and hydroxybenzoic esters.

Examples of the alkylamide plasticizers include toluenesulfonic acid alkylamides and benzenesulfonic acid alkylamides.

Preferred plasticizers are phthalic acid esters such as dibutyl phthalate, isodecyl phthalate, and di-2-ethylhexyl phthalate, hydroxybenzoic acid esters such as ethylhexyl p-hydroxybenzoate and hexyldecyl p-hydroxybenzoate, and alkylamides such as benzenesulfonic acid butylamide and benzenesulfonic acid 2-ethylhexylamide.

The thermoplastic resin composition of the invention may contain a relatively small amount of a flame retardant such as a bromine-containing compound and a triazine compound.

Examples of the bromine-containing compounds include brominated phenoxy resin, brominated polycarbonate, brominated polystyrene, poly-brominated styrene, and brominated polyphenylene ether.

Examples of the triazine compounds include cyanuric acid, isocyanuric acid, melamine, and melamine cyanurate.

In the use of the flame retardant, an auxiliary flame retardant can be used in combination. Examples of the auxiliary flame retardants include antimony trioxide, antimony pentoxide, antimony tetroxide, and sodium antimonate.

The thermoplastic resin composition of the invention can be molded by conventional molding methods such as injection molding, extrusion molding, blow molding, or vacuum molding.

The thermoplastic resin composition of the invention can be advantageously employable for productions of articles which are used under severe conditions. For instance, the thermoplastic resin composition can be used for manufacture of sole of shoes to be used in base ball, football, athletics. The thermoplastic resin composition also can favorably be employed for manufacture of gears, connectors, and sealing materials to be employed in electronic-precision instruments, sheet materials and sealing materials to be employed in car industries.

The thermoplastic resin composition of the invention can be molded in various forms such as sheets, films, tubes, hoses, and monofilaments. The thermoplastic resin composition also employed for manufacture of mirror boots of automobiles and uniform rate joint boots utilizing blow-molding.

The present invention is further described by the following examples. In the examples, the physical properties are values which are determined by the following procedures.

1) Relative viscosity ($\eta r$):

A polymer is dissolved in m-cresol (guaranteed reagent) at a concentration of 0.5 w/v %). The measurement is carried out at 25° C. by means of Ostwald's viscometer.

2) Bending test (bending modulus of elasticity, MPa)

A test sample (specimen: 6.25 mm×12.7 mm×12.7 mm) is subjected to the measurement defined in ASTM D790.

3) Impact resistance (Izod impact strength with notch, J/m)

A test sample (specimen: 3.18 mm×12.7 mm×12.7 mm) is subjected to the measurement defined in ASTM D256 (measured at 23° C.).

4) Melt flow rate (g/10 min.)

The measurement is carried out at 235° C. under a load of 2,160 g using a pellet.

5) Resistance to hydrolysis (in terms of retention %)

The thermoplastic resin composition was processed in an injection machine to give a resin sheet (100 mm×300 mm×2 mm). A dumbbell specimen (JIS No. 3 dumbbell) is cut out of the resin sheet.

The dumbbell specimen is placed in a stainless steel vessel (inner volume: 5 L). Into the vessel is then poured approx. 2 L of a distilled water. Subsequently, the vessel is sealed using a cover, and placed in a hot water bath heated to 80° C. for 2,000 hours. Then, the specimen is taken out. After water attached to the surface is removed, the specimen is fixed between a pair of chucks (distance between the chucks: 50 mm) and extended in a tensile machine at a rate of 500 mm/min, to determine a tensile elongation at break. The measurement of a tensile elongation at break is also performed using a dumbbell specimen having subjected to no hydrolysis treatment, to give a control value. A retention ratio of tensile elongation at break is calculated using the following equation:

Retention ratio of tensile elongation at break (%)=[Tensile elongation at break after hydrolysis]/[Control value]×100

Preparation Example 1

Polyetheramide (PAE-1)

In a pressure-resistant reaction vessel (inner volume: 70 L) equipped with a stirrer, a thermometer, a torque-meter, a pressure gauge, a nitrogen gas inlet, a pressure controller, and a polymer outlet were placed 11.000 kg of 12-aminododecanoic acid, 7.787 kg of triblock polyetherdiamine (XTJ-542, available from HUNTSMAN Corp., having the formula (1), x=approx. 3, y=approx. 9, z=approx. 2), and 1.122 kg of adipic acid. The gas inside of the reaction vessel was fully replaced with nitrogen gas. Subsequently, the content in the reaction vessel was heated to reach 230° C. for 3 hours under stirring in a stream of nitrogen gas at a rate of 300 L/hour. The temperature of the content was kept at 230° C. for 6 hours for performing polymerization. The pressure in the reaction vessel was adjusted to reach 0.05 MPa after the heating was started. Thereafter, the stirring was terminated, and the produced polymer was taken out through the polymer outlet in the form of a strand, cooled in water, processed to give approx. 13 kg of polymer pellets.

The resulting polymer is a flexible elastic white polyetheramide elastomer having $\eta r$ of 2.14.

PREPARATION EXAMPLE 2

Polyetheramide (PAE 2)

In a pressure-resistant reaction vessel (inner volume: 70 L) equipped with a stirrer, a thermometer, a torque-meter, a pressure gauge, a nitrogen gas inlet, a pressure controller, and a polymer outlet were placed 7.000 kg of 12-aminododecanoic acid, 11.380 kg of triblock polyetherdiamine (XTJ-542), and 1.620 kg of adipic acid. The gas inside of the reaction vessel was fully replaced with nitrogen gas. Subsequently, the content in the reaction vessel was heated to reach 230° C. for 3 hours under stirring in a stream of nitrogen gas at a rate of 300 L/hour. The temperature of the content was kept at 230° C. for 6 hours for performing polymerization. The pressure in the reaction vessel was adjusted to reach 0.05 MPa after the heating was started. Thereafter, the stirring was terminated, and the produced polymer was taken out through the polymer outlet in the form of a strand, cooled in water, processed to give approx. 13 kg of polymer pellets.

The resulting polymer is a flexible elastic white polyetheramide elastomer having $\eta r$ of 2.14.

PREPARATION EXAMPLE 3

Polyetheresteramide (PAE 3)

In a pressure-resistant reaction vessel (inner volume: 70 L) equipped with a stirrer, a thermometer, a torque-meter, a pressure gauge, a nitrogen gas inlet, a pressure controller, and a polymer outlet were placed 12.600 kg of 12-aminododecanoic acid and 0.944 kg of adipic acid. The gas inside of the reaction vessel was fully replaced with nitrogen gas. Subsequently, the content in the reaction vessel was heated to reach 240° C. for 3 hours under stirring at 20 rpm in a stream of nitrogen gas at a rate of 300 L/hour. The temperature of the content was decreased to 230° C. and polymerization was performed for 4 hours to produce an oligomer of nylon 12.

In the reaction vessel, 6.457 kg of polytetramethylene glycol (PolyTHF 1000, available from BASF), 0.020 kg of tetrabutyl zirconate, and 0.050 kg of an oxidation inhibitor (Tominox 917 available from Yoshitomi Pharmaceutical Co., Ltd.) were added to the oligomer. The gas inside of the reaction vessel was fully replaced with nitrogen gas. Subsequently, the content in the reaction vessel was gradually heated to reach 210° C. for 3 hours under stirring at 20 rpm in a stream of nitrogen gas at a rate of 300 L/hour. The temperature of the content was kept at 210° C. for 3 hours for performing polymerization. The pressure in the reaction vessel was decreased to reach 50 Pa for one hour, and the polymerization was continued for 2 hours. The content was further heated to reach 230° C. and the pressure was decreased to approx. 30 Pa. Then, the polymerization was further performed for 3 hours. Thereafter, the stirring was terminated, and nitrogen gas was introduced into the inside of the reaction vessel to reach atmospheric pressure. Then, the produced polymer was taken out through the polymer outlet in the form of a colorless, transparent strand, cooled in water, processed to give approx. 13 kg of polymer pellets.

The resulting polymer is a flexible elastic white polyetheresteramide elastomer having $\eta r$ of 2.09.

PREPARATION EXAMPLE 4

Polyetheresteramide (PAE 4)

In a pressure-resistant reaction vessel (inner volume: 70 L) equipped with a stirrer, a thermometer, a torque-meter, a pressure gauge, a nitrogen gas inlet, a pressure controller, and a polymer outlet were placed 9.800 kg of 12-aminododecanoic acid and 0.766 kg of adipic acid. The gas inside of the reaction vessel was fully replaced with nitrogen gas. Subsequently, the content in the reaction vessel was heated to reach 240° C. for 3 hours under stirring at 20 rpm in a stream of nitrogen gas at a rate of 300 L/hour. The temperature of the content was decreased to 230° C. and polymerization was performed for 4 hours to produce an oligomer of nylon 12.

In the reaction vessel, 9.434 kg of polytetramethylene glycol (PolyTHF 1800, available from BASF), 0.020 kg of tetrabutyl zirconate, and 0.050 kg of an oxidation inhibitor (Tominox 917 available from Yoshitomi Pharmaceutical Co., Ltd.) were added to the oligomer. The gas inside of the reaction vessel was fully replaced with nitrogen gas. Subsequently, the content in the reaction vessel was gradually heated to reach 210° C. for 3 hours under stirring at 20 rpm in a stream of nitrogen gas at a rate of 300 L/hour. The temperature of the content was kept at 210° C. for 3 hours for performing polymerization. The pressure in the reaction vessel was decreased to reach 50 Pa for one hour, and the polymerization was continued for 2 hours. The content was further heated to reach 230° C. and the pressure was decreased to approx. 30 Pa. Then, the polymerization was further performed for 3 hours. Thereafter, the stirring was terminated, and nitrogen gas was introduced into the inside of the reaction vessel to reach atmospheric pressure. Then, the produced polymer was taken out through the polymer outlet in the form of a colorless, transparent strand, cooled in water, processed to give approx. 13 kg of polymer pellets.

The resulting polymer is a flexible elastic white polyetheresteramide elastomer having $\eta r$ of 1.96.

EXAMPLE 1

Nylon 12 (80 weight parts) and polyetheramide elastomer (PAE-1) (20 weight parts) were blended. The blended polymer was melted and kneaded at 240° C. in a dual worm kneader (cylinder diameter: 40 mm) to extrude the kneaded polymer in the form of a strand and cooled in a water bath. The cooled polymer was processed in a pelletizer to give pellets of the polyamide resin composition.

EXAMPLE 2

The procedures of Example 1 were repeated using nylon 12 (70 weight parts) and polyetheramide elastomer (PAE-1) (30 weight parts), to give pellets of the polyamide resin composition.

EXAMPLE 3

The procedures of Example 1 were repeated using nylon 12 (80 weight parts) and polyetheramide elastomer (PAE-2) (20 weight parts), to give pellets of the polyamide resin composition.

EXAMPLE 4

The procedures of Example 1 were repeated using nylon 12 (70 weight parts) and polyetheramide elastomer (PAE-2) (30 weight parts), to give pellets of the polyamide resin composition.

COMPARISON EXAMPLE 1

The procedures of Example 1 were repeated using nylon 12 (100 weight parts) only, to give pellets of the polyamide resin composition.

COMPARISON EXAMPLE 2

The procedures of Example 1 were repeated using nylon 12 (80 weight parts) and polyetheresteramide elastomer (PAE-3) (20 weight parts), to give pellets of the polyamide resin composition.

COMPARISON EXAMPLE 3

The procedures of Example 1 were repeated using nylon 12 (80 weight parts) and polyetheresteramide elastomer (PAE-4) (20 weight parts), to give pellets of the polyamide resin composition.

Evaluation of the Thermoplastic Resin Composition—1

The thermoplastic resin compositions of Examples 1–4 and Comparison Examples 1–3 were evaluated in connection with the bending modulus of elasticity, Izod impact strength, melt flow rate, and resistance to hydrolysis by the aforementioned procedures. The results are set forth in Table 1.

TABLE 1

| Example | Bending modulus of elasticity (MPa) | Izod impact strength (J/m) | Melt flow rate (g/10 min) | Resistance to hydrolysis (retention %) |
|---|---|---|---|---|
| Example 1 | 980 | 285 | 18 | >100 |
| Example 2 | 840 | 310 | 18 | >100 |
| Example 3 | 880 | 380 | 17 | >100 |
| Example 4 | 750 | 450 | 18 | >100 |
| Com. Ex. 1 | 1,400 | 60 | 18 | >100 |
| Com. Ex. 2 | 960 | 280 | 18 | 55 |
| Com. Ex. 3 | 900 | 370 | 17 | 30 |

The polyamide resin composition of Comparison Example 1 containing no elastomer is apparently low in its Izod impact strength. The polyamide resin compositions of Comparison examples 2 and 3 using a polyetheresteramide elastomer is apparently low in its resistance to hydrolysis.

EXAMPLE 5

Nylon 12 (72 weight parts), polyetheramide elastomer (PAE-1) (18 weight parts), and a plasticizer (benzenesulfonic acid butylamide) were blended. The blended polymer was melted and kneaded at 240° C. in a dual worm kneader (cylinder diameter: 40 mm) to extrude the kneaded polymer in the form of a strand and cooled in a water bath. The cooled polymer was processed in a pelletizer to give pellets of the polyamide resin composition.

EXAMPLE 6

The procedures of Example 5 were repeated using ethylhexyl p-hydroxybenzoate as the plasticizer, to give pellets of the polyamide resin composition.

EXAMPLE 7

The procedures of Example 5 were repeated using PAE-2 as the polyetheramide elastomer, to give pellets of the polyamide resin composition.

COMPARISON EXAMPLE 4

The procedures of Example 5 were repeated using no elastomer, to give pellets of the polyamide resin composition.

COMPARISON EXAMPLE 5

The procedures of Example 5 were repeated using PAE-4 (polyetheresteramide elastomer) as the elastomer, to give pellets of the polyamide resin composition.

Evaluation of the Thermoplastic Resin Composition—2

The thermoplastic resin compositions of Examples 5–7 and Comparison Examples 4 and 5 were evaluated in connection with the bending modulus of elasticity, Izod impact strength, and resistance to hydrolysis by the aforementioned procedures. The results are set forth in Table 2.

TABLE 2

| Example | Bending modulus of elasticity (MPa) | Izod impact strength (J/m) | Resistance to hydrolysis (retention %) |
|---|---|---|---|
| Example 5 | 290 | not broken | >100 |
| Example 6 | 270 | not broken | >100 |
| Example 7 | 250 | not broken | >100 |
| Com. Ex. 4 | 430 | 225 | >100 |
| Com. Ex. 5 | 279 | not broken | 35 |

The polyamide resin composition of Comparison Example 4 containing no elastomer is relatively low in its Izod impact strength. The polyamide resin composition of Comparison example 5 using a polyetheresteramide elastomer is apparently low in its resistance to hydrolysis.

What is claimed is:

1. A thermoplastic resin composition comprising a mixture of a thermoplastic resin and a polyamide elastomer wherein the polyamide elastomer contains at least 50 weight % of a polyetheramide elastomer prepared by polymerization of a tri-block polyetherdiamine compound, a polyamide-forming monomer selected from the group consisting of an aminocarboxylic acid and a lactam compound, and a dicarboxylic acid compound, the tri-block polyetherdiamine compound having the following formula (1):

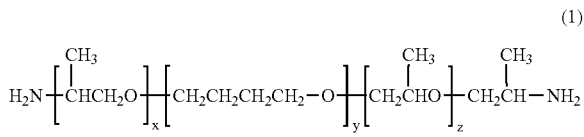

(1)

in which each of x and z independently represents an integer of 1 to 20, and y represents an integer of 4 to 50.

2. The thermoplastic resin composition of claim 1, wherein the mixture comprises 95 to 50 weight % of the thermoplastic resin and 5 to 50 weight % of the polyamide elastomer.

3. The thermoplastic resin composition of claim 1, wherein the thermoplastic resin is polyamide.

4. The thermoplastic resin composition of claim 1, wherein the dicarboxylic acid is oxalic acid or has the following formula (2):

$$HOOC-(R^1)_m-COOH \qquad (2)$$

in which $R^1$ is a linking group containing a hydrocarbon chain.

5. The thermoplastic resin composition of claim 4, wherein the dicarboxylic acid is selected from the group consisting of an aliphatic dicarboxylic acid and an alicyclic dicarboxylic acid.

6. The thermoplastic resin composition of claim 1, wherein the polyamide-forming monomer is an aminocarboxylic acid having the following formula (3) or a lactam compound having the following formula (4):

$$H_2N-R^2-COOH \quad (3)$$

$$-R^3-CONH- \quad (4)$$

in which each of $R^2$ and $R^3$ independently is a linking group having a hydrocarbon chain.

7. The thermoplastic resin composition of claim 1, wherein the resin composition further comprises a plasticizer in an amount of 1 to 30 weight parts based on 100 weight parts of the mixture.

8. A thermoplastic article comprising the thermoplastic resin composition of claim 7.

9. The thermoplastic resin composition of claim 1, wherein the resin composition further comprises a flame retardant in an amount of 5 to 40 weight parts based on 100 weight parts of the mixture.

10. A thermoplastic article comprising the thermoplastic resin composition of claim 9.

11. A thermoplastic article comprising the thermoplastic resin composition of claim 1.

12. A thermoplastic resin composition comprising a thermoplastic resin and a polyamide elastomer wherein the polyamide elastomer contains at least 50 weight % of a polyetheramide elastomer comprising 15 to 80 weight % of the following polyether segment (5):

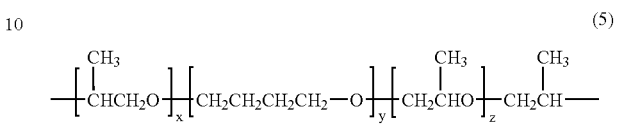
(5)

in which each of x and z independently represents an integer of 1 to 20, and y represents an integer of 4 to 50.

13. A thermoplastic article comprising the thermoplastic resin composition of claim 12.

\* \* \* \* \*